Jan. 5, 1954   A. F. RHODES ET AL   2,664,845
LINE TENSION SIGNAL
Filed Jan. 8, 1951   4 Sheets-Sheet 4
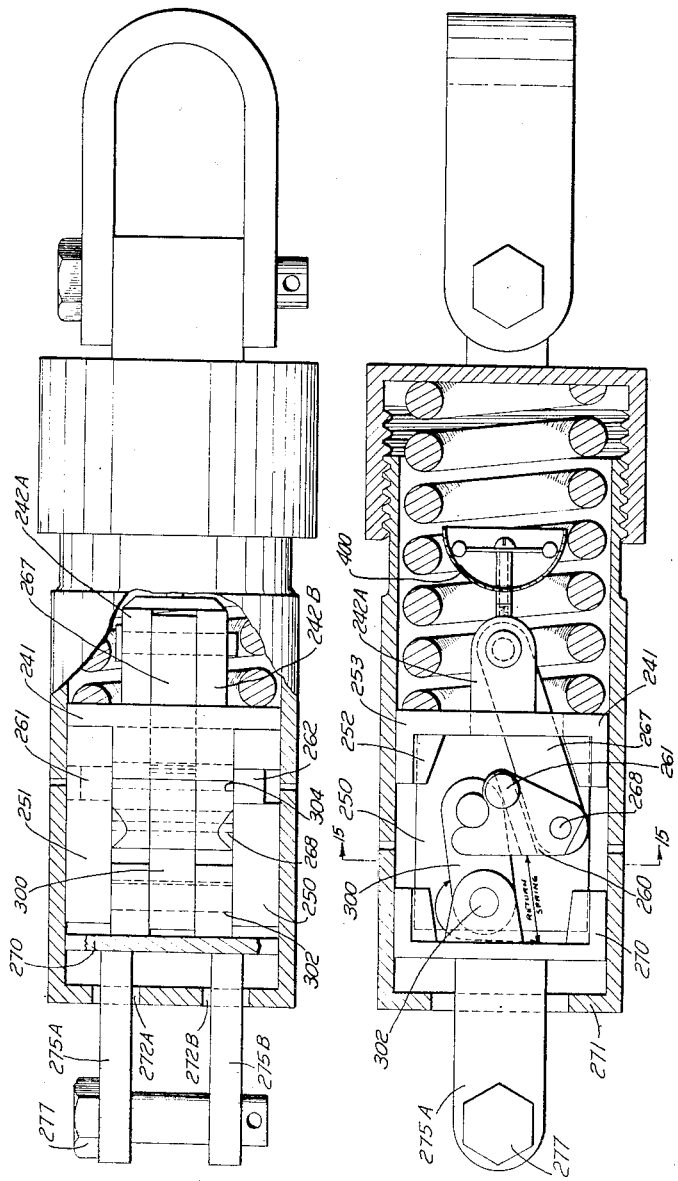
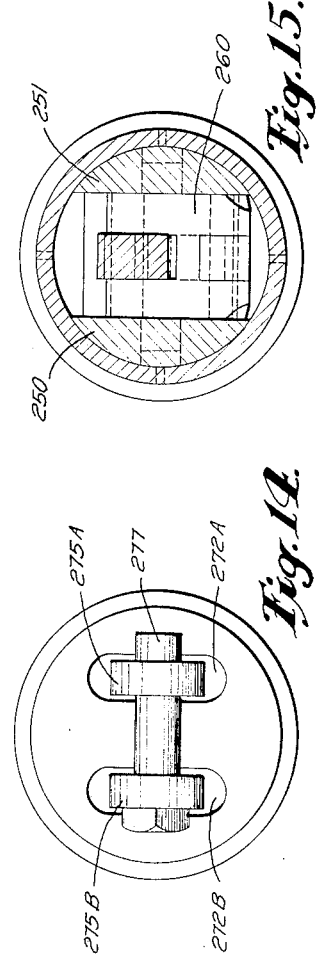
ALLEN F. RHODES
WILLIAM S. BACHMAN
INVENTORS
BY Murray Robinson
ATTORNEY Patented Jan. 5, 1954

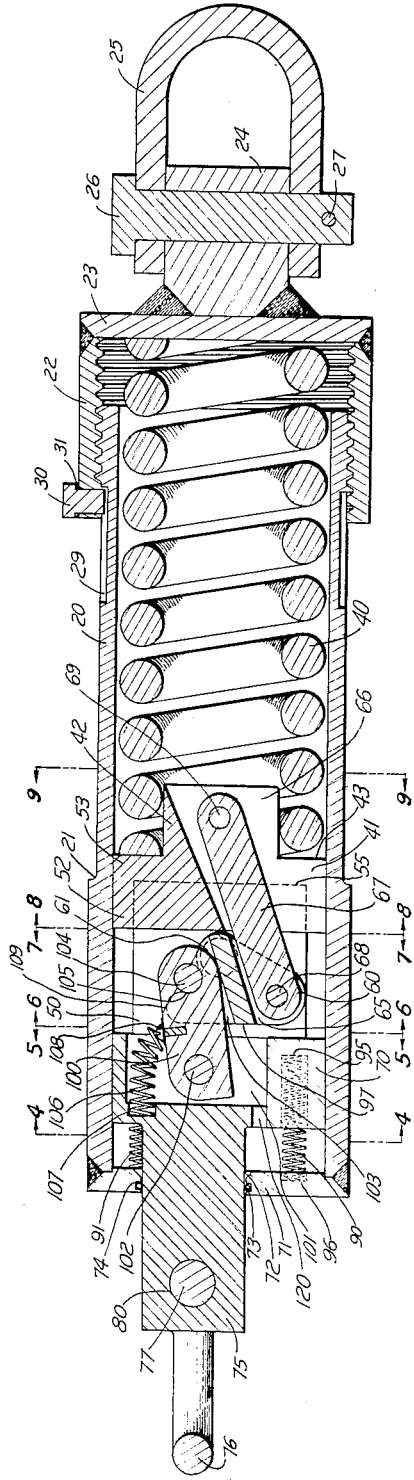

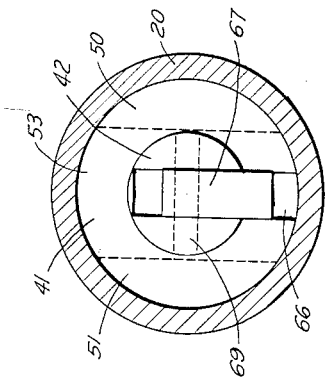
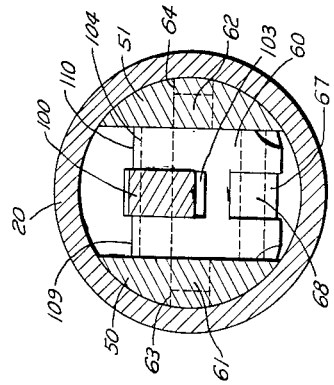
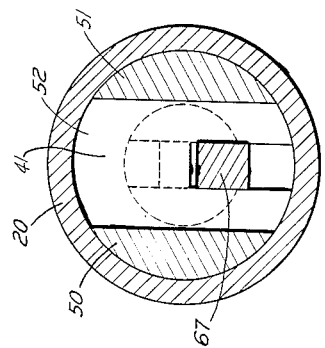
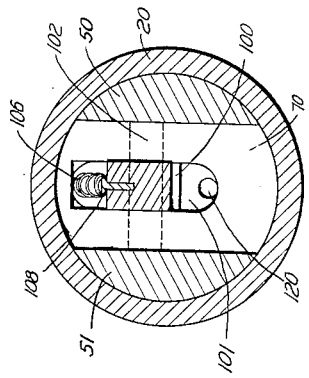
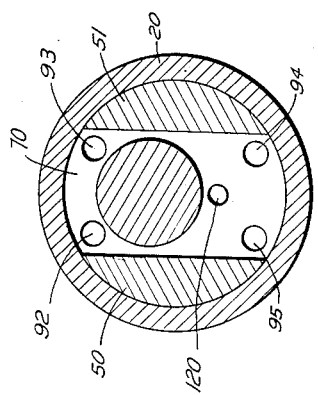
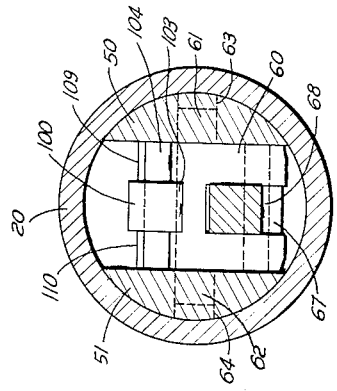

2,664,845

UNITED STATES PATENT OFFICE 2,664,845

LINE TENSION SIGNAL

Allen F. Rhodes and William S. Bachman, Houston, Tex.

Application January 8, 1951, Serial No. 205,016

12 Claims. (Cl. 116—67)

This invention pertains to a device for giving a signal when the tension thereon exceeds a certain value and more particularly to such a device used to signal the increase over a predetermined adjustable amount of the tension in a cable or line used to make up drill pipe, casing, or tubing employed in oil well drilling and production, such tension corresponding to the desired torque on the screw threads of the parts being connected.

It is an object of the invention to provide such a device which will be inexpensive to construct, operate and maintain, and which will be simple, safe, and reliable in operation.

It is another object of the invention to provide such a device which will be both light in weight and yet extremely durable.

It is a further object of the invention to provide such a device which will give an audible as well as visual signal when the line tension has exceeded an adjustable predetermined point.

It is another object of the invention to provide such a device which will automatically reset itself when the line tension has been reduced sufficiently below the predetermined point.

Other objects and advantages of the invention will become apparent as the disclosure thereof proceeds.

For a detailed description of preferred embodiments of the invention reference will now be made to the accompanying drawings wherein:

Figure 1 is an axial section through a line tension signal embodying the invention;

Figure 2 is a view of the left end of the device shown in Figure 1;

Figure 3 is a view of the right end of the device shown in Figure 1;

Figure 4 is a transverse section on the line 4—4 of Figure 1;

Figure 5 is a transverse section on the line 5—5 of Figure 1;

Figure 6 is a transverse section on the line 6—6 of Figure 1;

Figure 7 is a transverse section on the line 7—7 of Figure 1;

Figure 8 is a transverse section on the line 8—8 of Figure 1;

Figure 9 is a transverse section on the line 9—9 of Figure 1;

Figure 12 is a bottom plan view of a modified form of line tension indicator embodying the invention, with the housing partly broken away to expose the interior of the device;

Figure 13 is a side elevation, partly in section, of the device shown in Figure 12;

Figure 14 is a left end view of the device shown in Figure 12; and

Figure 15 is a transverse section taken on line 15—15 of Figure 13.

Figure 10:
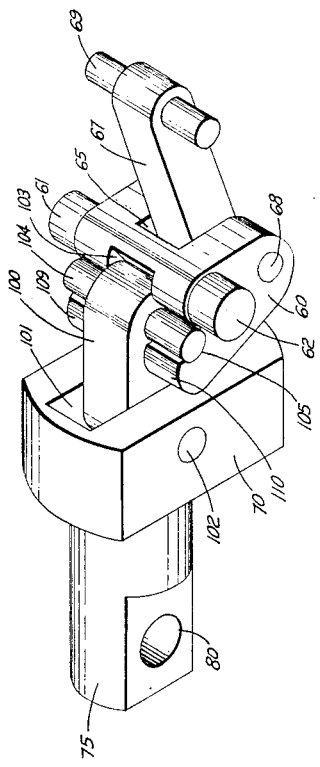
Figures 10 and 11 are isometric views of the lever and some of the associated elements of the device shown in Figure 1, showing the parts in different positions during the operation of the device.

Referring to Figure 1, the line tension signal comprises a barrel 20 of generally cylindrical form. For weight reduction the barrel is of reduced outer diameter at the right hand portion, the left hand portion being of larger outer diameter to provide a heavier section where the load is greatest. This leaves a shoulder 21 therebetween. The right end of the barrel is provided with a screw thread to which is connected a screw cap 22. To the disc 23 forming the end of the screw cap there is welded a post 24. A U shaped strap or stirrup 25 is pivotally connected to the post by a pin 26 secured by cotter pin 27. The strap is of such size that the end of a set of pipe tongs will fit snugly in the eye formed between the strap and the end of the post.

Barrel 20 is provided with a plurality of grooves 29 running parallel to the axis of the barrel and spaced apart about the circumference of the barrel. A lock pin 30 is screwed through a hole in the screw cap and held in place by a lockwasher 31. The end of pin 30 does not bottom in the grooves 29 even when it is screwed in as far as it will go, but the end of the pin does under such conditions extend into the groove far enough to prevent relative turning of the screw cap and barrel.

Within the barrel is disposed a helical compression spring 40, one end of which bears against the screw cap on the right end of the barrel. A piston 41 is slidably disposed inside the barrel. The right end 42 of the piston is reduced to fit inside the left end of spring 40. (See Figure 9, in which the spring 40 is omitted for clarity.) The left end of the spring bears against the shoulder 43 of the piston formed at the juncture of the large and small diameter portions thereof.

A pair of bearing blocks 50, 51 (see also Figure 8), each having one flat face and one face curved to fit the inside of the barrel, are secured inside the barrel with their flat faces parallel by means of a plurality of screws (not shown) passing through the barrel. The sides of the piston 41 are cut off flat at the left end 52 of the piston to fit between the bearing blocks. (See Figure 8.)

The center portion 53 of piston 41 is cylindrical and normally bears against the right hand ends 55 of the bearing blocks, being urged against them by the spring 40 which is in compression.

Between the bearing blocks is pivotally disposed a lever 60 having trunnions 61 and 62 (see also Figures 6 and 7) extending into bearings 63 and 64. The lever is centrally slotted at 65. The piston 41 is centrally slotted at 66. A link 67 has one end pivotally secured to the lever in slot 65 by means of pin 68 and the other end pivotally secured to the piston in slot 66 by means of pin 69.

A piston 70 has two flat sides (see also Figures 4 and 5) sliding between the bearing blocks 50, 51 and two curved sides conforming to the interior of the barrel. A disc 71 having an aperture 72 therethrough is welded to the end of the barrel. An O ring 73 of neoprene or other oil resistant rubberlike material is disposed in an annular groove 74 in the aperture 72. A post 75 on the piston extends through the O ring, sealing therewith. A chain shackle 76 is pivotally connected to the post by means of a pin 77 passing through the eyes 78, 79 thereof (see Figure 2) and an aperture 80 in the post and secured by cotter pin 81. An eye is thus formed between the body of the chain shackle and the end of the post within which may be secured a bight on the end of a cat line.

Four compression springs, including the two shown at 90, 91, in Figure 1, are disposed each with one end in one of the sockets 92, 93, 94, 95 (see Figure 4) in the piston 70, and with the other end in one of the four sockets in the disc 71 including the socket 96 shown in Figure 1. These springs urge piston 70 to the right so that it normally bears against the flat face 97 of lever 60 which is normally held in a position with face 97 perpendicular to the axis of the barrel, but in Figure 1, however, the piston is shown moved slightly to the left under tension applied to the device at the spring shackle 76 and strap 25. This much travel of the piston 70 represents lost motion and does not change the position of lever 60 which is shown in its normal position.

A link 100 has its left end disposed in slot 101 in the piston 70 and is pivotally connected thereto by means of pin 102. The right end of link 100 is disposed in slot 103 in the top of lever 60. A pin 104 extends through the right end of link 100 and is adapted to engage in depressions 105 in the side of the lever 60 (see also Figures 10 and 11). A compression spring 106 (omitted from Figures 10 and 11) has its left end disposed in a recess 107 in the piston 70 and its right end secured to link 100 by a screw 108 so as to urge link 100 clockwise, as viewed in Figure 1, into slot 103, so that pin 104 rests down behind the ends 109, 110 of the lever 60. If there were no tension at all on the device, the springs 90, 91 would move the piston to the right of the position shown in Figure 1 into contact with lever 60, and the pin 104 would not be in the bottom of depressions 105, this overtravel being necessary in order to allow the device to reset in the manner subsequently described herein.

There is a hole 120 through piston 70 to prevent air pressure on opposite sides thereof from damping its motion. The slot 66 goes clear through piston 41 and thereby serves the same purpose. The interior of the device may be suitably lubricated with oil or grease.

In operation of the device just described, the initial load will move the parts to the position shown in Figure 1. Thereafter additional tension will be transmitted from stirrup 25 through pin 26, post 24, cap 22, barrel 20, and bearing blocks 50, 51, to trunnions 61 and 62 of lever 60 and will be transmitted from shackle 76 through pin 77, post 75, piston 70, pin 102, link 100, pin 104, to the ends 109, 110 of lever 60. A fraction of this tension force, depending on the relative lengths of the lever arms, will be transmitted by lever 60 through pin 68, link 67, pin 69, and piston 41 to spring 40, tending to compress the spring 40. When this force exceeds the initial compression of spring 40 it will compress, lever 60 will turn (see Figure 10), and the shackle 76 will move away from stirrup 25.

The stirrup, shackle, pins, posts, screw cap and barrel, pistons, lever, links, and spring 40 thus constitute a resilient connecting means. Spring 40 constitutes an elastic means which is resistant to deformation with a force proportional to some function, usually approximately linear, of the deformation and the remainder of the resilient connection constitutes a means to impose a force thereon proportional to a function, usually linear, of the tension applied to the device. The lever 60 serves as a means to reduce this force to less than the line tension. While spring 40 is a compression spring, by redisposition of the means to apply force thereto a tension or torsion spring could be substituted therefor. Also, instead of an elastic solid, an elastic fluid could be used for the spring 40.

Figure 11:
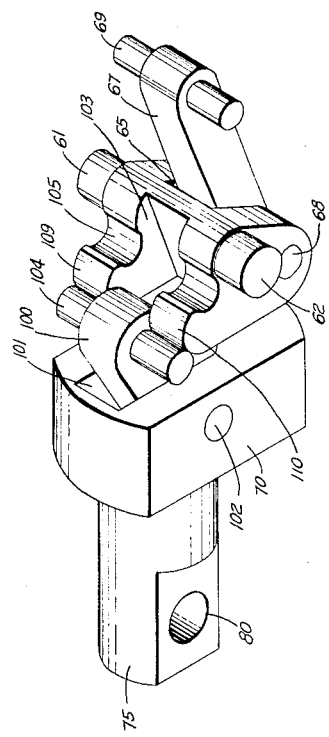

Upon the application of additional tension to the device the lever 60 continues to turn counter clockwise, as viewed in Figure 1, until the ends 109, 110 thereof slip under pin 104 (see Figure 11). Shackle 76 then is free to move to the left (except for the resistance of the four springs 90, 91, et al.) and moves away from stirrup 25 until piston 70 engages disc 71. Thereafter load is transferred from stirrup 25 through pin 26, cap 22 and barrel 20, to disc 71, and from disc 71 thru piston 70, post 75, pin 77 to shackle 76. Thus, the trip means or break joint constituted by link 100 and lever 60 serves to disconnect the resilient connecting means and the load is thereafter transferred to the lost motion joint or connection comprising the piston 70, the barrel 20, and disc 71. This prevents complete separation of the parts connected by the device.

When the load is transferred from the resilient connection to the lost motion connection, by operation of the trip means, the energy stored in spring 40 is released and causes the spring to expand forcing piston 41 against the bearing blocks and the impact produces a high intensity, loud, audible signal or noise. At nearly the same time the piston 70, released from spring 40, travels freely under the force of line tension (except for the compression of the four reset springs 90, 91, and others), closing the space between the piston and the disc 71 still remaining at the time the pin 104 slipped over the ends 109, 110 of lever 60. The piston 70 strikes the disc 71 producing a high intensity, loud, audible signal or noise.

Upon reduction of the line tension to less than the force exerted by tre reset springs, they will serve as part of means to reset the device by pushing piston 70 back against the flat face 97 of lever 60 which has already been returned to its initial position by the release of spring 40. As the piston 70 is returned to normal or starting position the pin 104 on link 100 rides up over the ends 109, 110 of lever 60 and is forced down back of lever ends 109, 110, by spring 106 which serves as another part of the reset means. The four reset springs 90, 91 et al. and spring 106 constitute elastic means resisting deformation with a force proportional to a function, usually nearly linear, of their deformation or compression. By suitable variation of the means including the piston 70, disc 71, and link 100 for imposing a force thereon proportional to a function of the line tension, other types of springs; tension, torsion, or fluid could be used instead of the compression springs shown.

By adjusting the position of screw cap 22 on barrel 20, the initial deformation or stress of spring 40 can be varied to change the predetermined line tension needed to produce the predetermined deformation of the spring 40 required to release the trip means or break joint. The prestressing of the spring 40 insures that a loud report will be produced when the spring is released. The audible signal given by the hammering of piston 41 against the bearing blocks and of piston 70 against disc 71 is to be distinguished from a mere indication such as the movement of a pointer over a scale which has to be read as in an ordinary spring balance. In addition to the audible signal a visual signal can also be produced, e. g., by painting the inner portion of post 75 a distinctive color which becomes exposed to the outside only during the extreme movement of the piston 70 after the break joint has tripped. The sudden appearance of the colored part of the post is likewise a distinct signal to be distinguished from a mere indication which has to be read.

The safety features of the invention include the complete enclosure of the working parts by the outer barrel and the provision of a lost motion connection to take the load after the break joint has disconnected the resilient connection. Both of these points are very important to the workmen in the vicinity of the device when in use since failure of the internal structure cannot scatter metal parts through the air at high velocity, and release of the break joint does not free the cat line to allow it to fly loose.

By virtue of the means for reducing the force on the signal actuating spring, which includes the lever 60, the spring need not be so large and heavy. At the same time the spring is large enough to produce a loud signal and stand the considerable abuse inherent in oil field use. The self-resetting feature insures the device will be used each time a connection is made, so that all connections will be made up tight enough to prevent leaks and yet not so tight as to overstress and gall the threads.

Referring now to Figures 10 through 13, the device there shown is generally similar to that previously described and most of the parts and operation thereof will be easily understood without further description. Similar parts have been given reference numbers two hundred greater than used for the first described embodiment. Differences from the previous construction include the bell 400 secured to posts 242A, 242B on piston 241, to produce an audible signal of longer duration than the reports occurring when the piston 241 strikes the bearing blocks 250, 251, and piston 270 strikes disc 271. A further difference lies in the use of twin posts 275A and 275B connected to piston 270 and extending through apertures 272A and 272B in disc 271 and the provision of a pin 277 passing through the outer ends of the posts to provide a means to connect the device to a cat line or cable.

While preferred embodiments of the invention have been shown and described it is obvious that many modifications thereof can be made by one skilled in the art without departing from the spirit of the invention, and it is desired to protect by Letters Patent all forms of the invention falling within the scope of the following claims.

We claim:

1. In combination, means to connect one member to another to transmit tension therebetween including elastic signal actuating means resistant to deformation with a force proportional to a function of the deformation, means to impose on the signal actuating means a force proportional to a function of the line tension, the last said means including trip means disconnecting the force imposing means upon predetermined deformation of the signal actuating means, means connected to the signal actuating means to produce a signal when said trip means has disconnected said force imposing means, elastic reset means resisting deformation with a force proportional to a function of the deformation, means to apply to the reset means a force proportional to a function of the line tension, and means connecting the reset means to the trip means to reconnect the force imposing means to the signal actuating means upon reduction of line tension, said connecting means continuing to function after the line tension has surpassed the point required to actuate said signal.

2. The combination of claim 1 in which the force imposing means is adjustable to vary the line tension required to produce said predetermined deformation of the signal actuating means.

3. The combination of claim 1 in which the signal is audible and the signal actuating means is prestressed to increase the intensity of the signal.

4. In combination, means to connect one member to another to transmit tension therebetween including a break joint held in connecting position by a spring subjected to a force varying with the line tension and breaking upon increase of line tension beyond a predetermined point and a lost motion joint paralleling the break joint and taking tension only after disconnection of the break joint, and the break joint taking no tension when disconnected.

5. The combination of claim 4 in which the spring of the break joint is released upon line tension exceeding said predetermined point and means is connected to the last said spring to produce an audible signal upon said release.

6. The combination of claim 4 in which a reset spring is connected to the relatively movable parts of the lost motion joint to urge them away from load taking position to reset the break joint on reduction of line tension.

7. The combination of claim 6 in which the force of the reset spring is small compared to the line tension required to disconnect the break joint, whereby movement of said lost motion joint to tension taking position upon disconnection of said break joint occurs rapidly producing an audible signal.

8. In combination, means to connect one member to another comprising a resilient connection, means to break said resilient connection upon imposition of tension exceeding a predetermined value and a lost motion connection paralleling the resilient connection adapted to take tension load only after the resilient connection has been elongated to the breaking point, said resilient connection taking no load when it is broken.

9. The combination of claim 8 with means to produce a signal upon transfer of the load from the resilient connection to the lost motion connection, said signal being actuated by the energy stored in said resilient connection prior to said transfer.

10. The combination of claim 9 with means to reconnect the resilient connection upon reduction of line tension.

11. In combination, a cylindrical barrel having a screw thread on one end, a screw cap screwed to said one end, a securing device connected to said screw cap, a compression spring disposed inside said barrel with one end bearing against said screw cap, a piston inside said barrel making a sliding fit therewith, said piston bearing against the other end of said spring, an abutment inside said barrel limiting the travel of said piston in the direction away from said screw cap, said spring being prestressed to urge said piston against said abutment and normally causing it to seat thereagainst, a lever pivotally mounted inside said barrel, a link connecting said lever to said piston a second piston slidably disposed in said barrel, a link pivotally connected to the second piston and releasably pivotally connected to the lever, an apertured disc closing the other end of the barrel, a post on the second piston extending through said aperture, another securing device connected to said post, a spring connected to said second piston urging it away from said disc and a spring connected to said link urging said link into engagement with said lever.

12. In combination, means to connect one member to another member; trip means to break said connection upon increase of load on said connection beyond a predetermined value, and means to connect said members paralleling the first said means to take load after the connection of the first said means has been broken.

ALLEN F. RHODES.
WILLIAM S. BACHMAN.

References Cited in the file of this patent
UNITED STATES PATENTS

| Number | Name | Date |
| --- | --- | --- |
| 1,379,874 | Miller | May 31, 1921 |
| 2,287,516 | Endres | June 23, 1942 |
| 2,414,161 | Moore | Jan. 14, 1947 |